Feb. 12, 1963 R. J. GRADY 3,077,581
DYNAMIC INFORMATION STORAGE UNIT
Filed Feb. 2, 1959
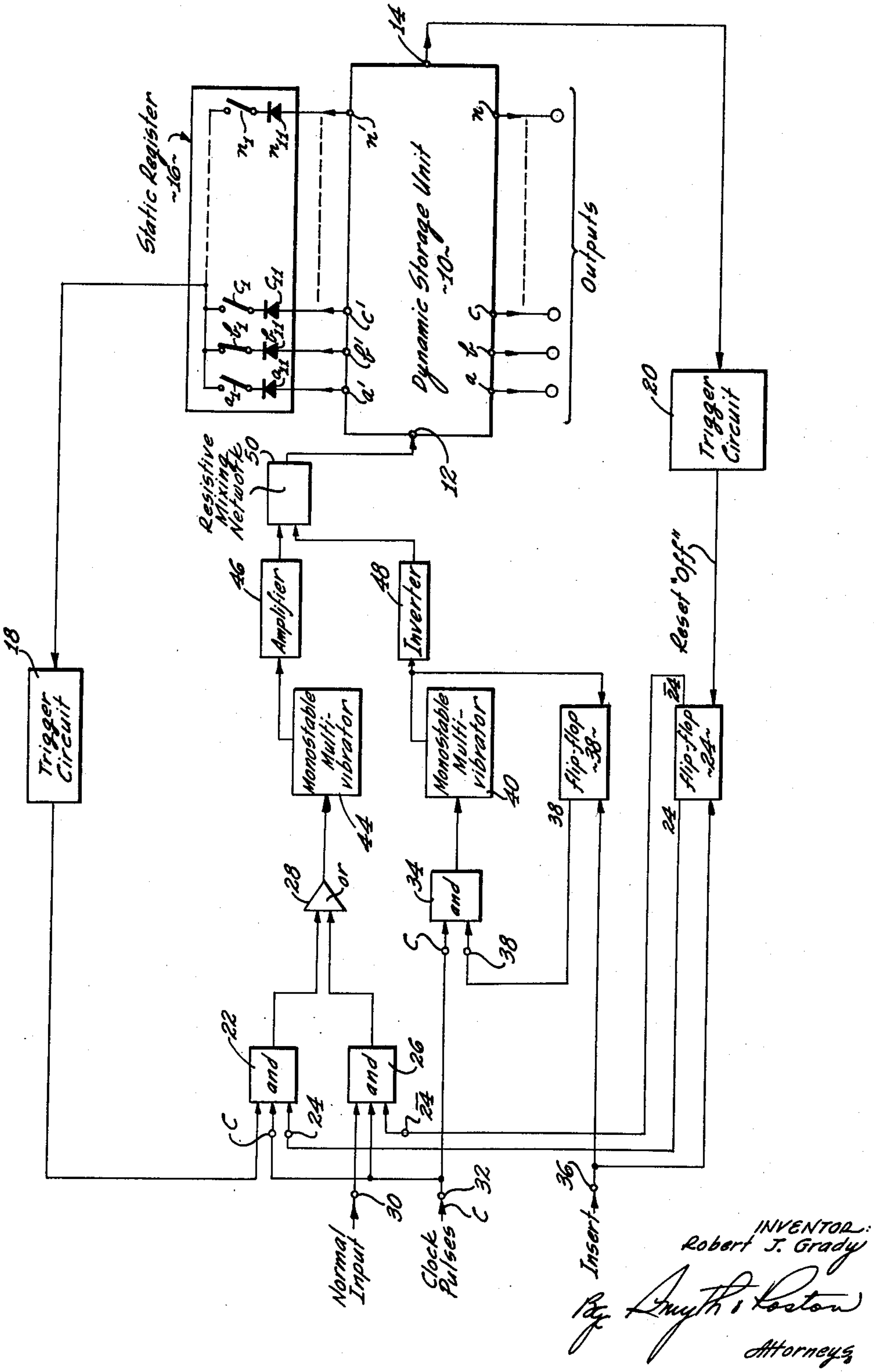
INVENTOR:
Robert J. Grady
By Smyth & Roston
Attorneys United States Patent Office 3,077,581

Patented Feb. 12, 1963

3,077,581

DYNAMIC INFORMATION STORAGE UNIT

Robert J. Grady, Los Angeles, Calif., assignor to The Magnavox Company, Los Angeles, Calif., a corporation of Delaware Filed Feb. 2, 1959, Ser. No. 790,519
13 Claims. (Cl. 340—173)

The present invention relates to electronic pulse storage systems which incorporate a dynamic storage unit for receiving and storing pulses representing, for example, binary data. The invention is more particularly concerned with a pulse storage system in which binary data set up in parallel form in a static register is transferred to a serial-type dynamic storage unit. The latter unit may be used to store and to provide serial output pulses corresponding to the data originally set up in the static register.

Dynamic storage units are presently in widespread use in electronic digital computers and in other electronic equipment in which binary data is stored and utilized. This binary data may represent actual information, for example, or it may represent a coding schedule for coding and decoding signals for use in controlling the operation of different stages. Such a storage unit may comprise, for example, one or more delay lines, each having a length corresponding to a predetermined time delay. The binary data to be stored in the unit is timed by clock pulses so that each binary bit occurs in synchronism with an individual clock pulse. The clock pulses thereby establish the bit-time, or digit time, in the storage system.

The delay of the delay lines in the dynamic storage unit is made to correspond to a predetermined number of bit times equivalent, for example, to a selected word time. This enables a word group of binary pulses to be introduced to the dynamic storage unit and to be circulated in the unit until needed.

The delay line, or lines, in the dynamic storage unit may be of the usual lumped inductance/lumped capacitance type. When such a delay line is used, electric input signals are introduced to one or more input terminals, and output signals with appropriate delays are derived from one or more output terminals.

Alternately, the delay line or lines in the dynamic storage unit may be of the magnetostrictive or equivalent type. As is well known, when magnetostrictive delay lines are used the input signals are introduced to one or more write heads which convert the electrical input signals into magnetic pulses which set up the magnetostrictive effects in the delay lines. Moreover, this latter type of delay line requires one or more read heads to produce electrical output pulses with appropriate time delays with respect to the input pulses.

Appropriate electric circuitry is provided in conjunction with the delay lines in the dynamic storage unit for feeding the output pulses back to the input terminals, so that the data represented by such pulses may be circulated and thereby retained in the unit until needed.

As will be described, additional intermediate terminals or read heads are provided at intermediate points on the delay line, or lines, in the dynamic storage unit, and these serve to produce output pulses corresponding to the data flowing through the delay lines but occurring at different predetermined digit times at the different terminals or read heads.

It is often desirable in equipment of the type under discussion first to set up the binary data to be utilized by the equipment in a static register. This static register may, for example, include a plurality of flip-flops, or it may include a set of manually operable mechanical contacts. The improved system of the present invention is such that information set up in such a static register in parallel form may be serially inserted into a dynamic storage unit of the type referred to above.

In the improved system of the invention, the switching contacts (or equivalent elements) in the static register are sampled at a high rate by the passage through the dynamic storage unit of a pulse inserted into the storage unit. This pulse travels through the dynamic storage unit to the successive switch contact in the static register to obtain the production of signals in accordance with the settings of these successive switch contacts. The sequential testing of the information represented in parallel form by the settings of the switches in the static register causes the information to be converted into a serial form represented by a sequence of pulses. This sequence of pulses is then transferred into the dynamic storage unit for passage through the unit.

By way of illustration, the apparatus constituting this invention may be used to insert an initial condition into a recursive logic code-train generator. In such a combination, the selected code to be used may be set up manually in the mechanical switches to control the operation of the generator in developing a series of pseudo-random coding pulses. A similar generator, upon the same setting of a similar set of mechanical switches, generates pseudo-random decoding pulses which occur in timed coincidence with the coding pulses. These coding and decoding units may, for example, be used at a transmitter and at a plurality of receivers for coded communication purposes.

Alternately, the coding unit can be used as an input to a computer from, for example, a plurality of manually operated keys on the keyboard of the computer. In fact the unit can be used in any application in which it is desired to convert parallel-stored data in a static register to serial-form data for storage in a dynamic storage unit. This serial information can be subsequently generated from the dynamic storage unit in serial form for any particular use desired.

When a dynamic storage unit is used in a recursive logic code-train generator of the type mentioned above, it becomes necessary to insert information in serial form into the unit from a parallel form in which the information exists as represented by the relative settings of mechanical switches. It is therefore necessary to provide a means for providing high speed commutation of the mechanical switches. In accordance with an important concept of the present invention, the dynamic storage unit itself functions as a part of a high speed commutator for the mechanical switches. In the embodiment of the invention to be described, the storage unit utilizes signals of one polarity for commutation purposes while simultaneously receiving and storing information of the opposite polarity from the set of mechanical switches.

It will become evident as the description proceeds that the improved system of the invention has general utility, however, in transferring parallel stored information from a static register in serial form to a dynamic storage unit for subsequent generation and use.

The features of the invention which are believed to be new are set with particularity in the appended claims. The invention itself, however, together with further features and advantages, may best be understood by reference to the following description when taken in conjunction with the accompanying drawing, in which the single FIGURE is a functional block diagram of a system illustrating one embodiment of the invention.

The illustrated embodiment of the invention includes a dynamic storage unit 10 which may be of the delay line type referred to above. The dynamic storage unit includes an input terminal 12, to which binary data in the form of input pulses is introduced. The unit also includes an output terminal 14, at which the input pulses inserted at the terminal 12 appear as output pulses after a predetermined time delay. As mentioned above, suitable circuitry is usually provided for interconnecting the output terminal 14 with the input terminal 12 to provide a normal circulation for the information stored in the dynamic storage unit.

The storage unit also includes a plurality of intermediate output terminals (*a*, *b*, *c* . . . *n*). These intermediate output terminals are capable of producing the input pulses at a different time with respect to one another and with respect to the output terminal 14. For example, when a delay of twelve bit times exists between the input terminal 12 and the output terminal 14, it may be appropriate to provide a one bit delay between the input terminal 12 and the intermediate output terminal *a*, a two bit delay between the input terminal 12 and the output terminal *b*, and so on. The dynamic storage unit 10 in accordance with the present invention is also provided with a plurality of output terminals *a'*, *b'*, *c'* . . . *n'*, which correspond respectively to the output terminals *a*, *b*, *c* . . . *n*.

The illustrated system also includes a static register 16. This static register, as mentioned above, may include a set of manually operated switches designated $a_1$, $b_1$, $c_1$ . . . $n_1$. These switches may be capable of being manually set, or they may be set in any appropriate automatic, mechanical or electrical manner. Moreover, the switches may in fact represent individual flip-flops in the static register, with an open switch being represented by the corresponding flip-flop in a false state, and with a closed switch being represented by a corresponding flip-flop in a true state, for example.

A plurality of unidirectional coupling devices such as the diodes $a_{11}$, $b_{11}$, $c_{11}$ . . . $n_{11}$ are included in the static register 16. These diodes have their cathodes connected respectively to different ones of the switches $a_1$, $b_1$, $c_1$ . . . $n_1$; and the diodes have their anodes connected respectively to different ones of the output terminals *a'*, *b'*, *c'* . . . *n'* of the dynamic storage unit 10. The switches $a_1$, $b_1$, $c_1$ . . . $n_1$ are illustrated as being of the single-pole, single-throw type, with the armatures of the respective switches being connected to the cathodes of the corresponding diodes $a_{11}$, $b_{11}$, $c_{11}$ . . . $n_{11}$. A closed switch of this group may be considered as representing binary "1," and an open switch may be considered as representing binary "0."

The fixed contacts of all the switches $a_1$, $b_1$, $c_1$ . . . $n_1$ in the static register 16 are connected together and to the input of a trigger circuit 18. The trigger circuit 18 may be of any usual type, such as a Schmidt trigger or a blocking oscillator or a monostable multivibrator. For example, the construction of a suitable blocking oscillator is shown and described on page 2–68 of "Principles of Radar," by the staff of the Massachusetts Institute of Technology.

The trigger circuit 18 responds to input pulses of only one polarity so as to become changed in operation instantaneously from a stable state to an unstable state. The trigger circuit 18 subsequently changes on an instantaneous basis back to its original state after a predetermined time. This action of the trigger circuit in response to the input pulses results in the production of rectangular output pulses having fast rise and fast fall times. The purpose of the circuit is to reshape the input pulses which may have become distorted in passing through the dynamic storage unit. The output terminal 14 is connected to a trigger circuit 20 which may be similar in its construction to the trigger circuit 18.

The output terminal of the trigger circuit 18 is connected to one of the input terminals of an "and" network 22. The "and" network responds to a plurality of input signals to produce an output signal, the output signal being produced only when input signals are simultaneously introduced to all of the input terminals in the network. The "and" network may be constructed in a manner similar to that described and shown on page 32 of "Arithmetic Operations in Digital Computers," by R. K. Richards (published by D. Van Nostrand Company in 1955).

The output terminal of the trigger circuit 20 is connected to the right input terminal of a flip-flop 24. The flip-flop 24 may be constructed in a manner similar to that disclosed on pages 164 to 166, inclusive, of volume 19 entitled "Wave Forms" of the Radiation Laboratory Series published in 1949 by the Massachusetts Institute of Technology. The flip-flop 24 is provided with two input terminals which may be respectively designated as the left and right input terminals. The flip-flop 24 is provided with two output terminals which may be respectively designated as the left and right output terminals. The left input and output terminals are obtained from one current control member such as a tube in the flip-flop and the left and right terminals are obtained from a second current control member in the flip-flop. The left output terminal (24) of the flip-flop 24 is connected to another input terminal of the "and" network 22, and the right output terminal ($\overline{24}$) of the flip-flop 24 is connected to one of the input terminals of an "and" network 26.

The output terminal of the "and" network 22 is connected to one of the input terminals of an "or" network 28, and the output terminal of the "and" network 26 is connected to another of the input terminals of the "or" network 28. These "or" networks are constructed to produce an output signal when signals are introduced to any one or more of their input terminals. The "or" networks, such as the network 28, may be constructed in a manner similar to that described and shown on page 32 of "Arithmetic Operations in Digital Computers," by R. K. Richards.

The illustrated system includes an input terminal 30 for receiving normal input pulses. These input pulses are provided with a particular polarity such as a negative polarity for reasons which will be described in detail subsequently. The input terminal 30 is connected to another input terminal of the "and" network 26. The system also includes an input terminal 32 which is connected to receive clock pulses. As mentioned above, these clock pulses occur at regular timing intervals, and they define the bit times of the binary data utilized by the system. The clock pulses may be produced by suitable circuitry such as a blocking oscillator or a signal generator or by the clock channel of a magnetic drum. The terminal 32 is connected to another input terminal of the "and" network 22, and it is also connected to an "and" network 34.

The system also includes an input terminal 36 which receives "insert" pulses. The input terminal 36 is connected to the left input terminal of a flip-flop 38. The left (38) output terminal of the flip-flop 38 is connected to a second input terminal of the "and" network 34.

The "and" network 34 is connected to the input terminal of a monostable multivibrator 40. Such multivibrators are known to the electronic art, and the multivibrator 40 may take the form of the multivibrator shown and described in Millman and Taub, "Pulse and Digital Circuits" at pages 187–190 and 599–602. This text was published by the McGraw-Hill Company in 1956. The multivibrator is designed to return to its original state after each triggering pulse before the occurrence of the next clock pulse.

The "or" network 28 has its output terminal connected to the left input terminal of a monostable multivibrator 44 which may be similar in its construction to the multivibrator 40. This latter multivibrator, like the multivibrator 40, returns to its original stable state a predetermined time after it is triggered to its unstable state, the return after each such triggering occurring before the next clock pulse.

The output terminal of the multivibrator 44 is connected to a non-inverting amplifier 46 which may be formed from two amplifier stages each providing an inversion, or which may be formed from a cathode follower stage or its equivalent transistor circuit, and the left output terminal (40) of the multivibrator 40 is connected to an inverter 48. The inverter 48 is constructed in known manner to provide an output term which is true when its input term is false, and vice versa.

The amplifier 46 is connected to one input terminal of a resistive mixing network 50, and the inverter 48 is connected to a second input terminal of that network. The output terminal of the network 50 is connected to the input terminal 12 of the dynamic storage unit 10.

In normal operation, both the flip-flops 24 and 38 are in their false states. In this condition, the "and" network 22 is rendered non-conductive because its input term (24) is false, and the "and" network 34 is rendered non-conductive because its input term (38) is false. The "and" network 26, on the other hand, is conditioned for conduction because its input term ($\overline{24}$) is true. Therefore, normal input pulses introduced to the input terminal 30 in coincident time relationship with the clock pulses (C) pass through the "and" network 26, and through the "or" network 28, to repeatedly trigger the monostable multivibrator 44 to its false state. The output from the multivibrator 44 is arbitrarily assumed to be of negative polarity, and this output is amplified by the non-inverting amplifier 46 which drives the dynamic storage unit 10.

The negative input pulses from the amplifier 46 are introduced to the delay lines incorporated in the dynamic storage unit 10. Because of the normal input 30, these negative-going pulses have no effect on the static register 16 as they travel down the delay lines, or equivalent elements, in the dynamic storage unit 10. This is because the diodes $a_{11}$, $b_{11}$, $c_{11}$ . . . $n_{11}$ are connected with such a polarity that they do not pass the negative pulses. There is, therefore, no output from the static register 16 in the presence of the normal pulses circulated through the dynamic storage unit 10.

Both the trigger circuit 18 and the trigger circuit 20 are biased to respond to input pulses of positive polarity only. Therefore, the normal input pulses introduced to the input terminal 30 and passed to the dynamic storage unit 10 with negative polarity can have no effect on the trigger circuits 18 and 20. These negative pulses travel through the dynamic storage unit 10 with the desired increments of time to appear with a predetermined time delay at each of the output terminals *a*, *b*, *c*, . . . *n*.

Appropriate logical circuitry may be incorporated with the normal input terminal 30 and with any one of the output terminals to provide for an input system, a circulating system and an output system for the normal pulses. In this condition, therefore, the dynamic storage unit 10 performs its normal function in which pulses applied to the normal input terminal 30 may be stored by the unit 10 for subsequent passage through the output terminal 14 or one of the terminals *a*, *b*, *c*, etc., for any desired time interval. The pulses may, when required, be generated in serial form for use in associated equipment upon the introduction of a sufficient number of pulses to the terminal 30 for the first pulses to pass through the unit 10 to the desired output terminal in the unit.

At certain times, it may be desired to introduce information from the static register 16 into the dynamic storage unit 10. At such times, the switches $a_1$, $b_1$, $c_1$ . . . $n_1$, or their equivalents, in the static register are provided with desired settings dependent upon the information to be stored in parallel form in the static register. Then, an insert pulse is applied to the input terminal 36 to trigger the flip-flops 24 and 28 to the true state. This triggering of the flip-flops 24 and 38 conditions the "and" network 22 and the "and" network 34 for the passage of pulses through the "and" networks. Also, the "and" network 26 is now inhibited because its input term ($\overline{24}$) is now false. Therefore, the normal input pulses are prevented from entering the system.

Because the "and" network 34 is conditioned for conduction by its input term (38), the next clock pulse (C) passes through this "and" gate to trigger the monostable multivibrator 40 to its unstable state. The resulting negative output pulse from the multivibrator 40 is amplified and inverted in the inverter 48. The resulting positive pulse from the inverter is passed through the network 50 and through the input terminal 12 to the dynamic storage unit 10. The same negative output pulse from the multivibrator 40 sets the flip-flop 38 false, so that the "and" network 34 is not conductive to any subsequent clock pulses.

Therefore, one positive input pulse only is applied to the storage unit 10 at the first bit time following the insert pulse at the input terminal 36. As this positive pulse progresses through the storage unit 10, it is introduced to the anodes of the diodes $a_{11}$, $b_{11}$, $c_{11}$ . . . $n_{11}$ in succession. The polarity of these diodes is such that a positive pulse is applied to the trigger circuit 18 each time that the positive pulse passing through the storage unit 10 encounters a diode in the static register 16 whose cathode is connected to a closed switch contact. The purpose of this procedure is to provide a high speed commutation of the static register 16 by the dynamic storage unit 10 itself. The time spacing of the output terminals *a'*, *b'*, *c'* . . . *n'* may be chosen so that each terminal is separated by the interval between successive clock pulses (C), and so that the input pulses to the trigger circuit 18 occur at the clock times.

The positive input pulse train to the trigger circuit 18, is a serial form of the information produced in parallel form in the static register. This positive input pulse train is re-shaped and inverted by the trigger circuit 18. The resulting negative output pulses from the trigger circuit 18 now pass through the "and" network 22 and through the "or" network 28 to trigger the multivibrator 44 since the pulses are coincident with successive ones of the clock pulses (C). The output from the multivibrator 44 is amplified by the amplifier 46 and passed through the network 50 to the input terminal 12. Therefore, for each closed contact of the static register 16, a negative polarity pulse is inserted at the appropriate clock time into the dynamic storage unit 10. As in normal operation, these negative pulses do not affect the elements of the static register because of the polarity of the diodes $a_{11}$, $b_{11}$, $c_{11}$ . . . $n_{11}$.

When the positive insert pulse reaches the end of the dynamic storage unit 10, it appears at the output terminal 14 and is introduced to the trigger circuit 20. The resulting output pulse of the trigger circuits resets the flip-flop 24 to the false state. This again conditions the "and" network 26 for normal input and inhibits the "and" network 22 against the passage of pulses. The system is thereby returned to its operational mode for normal operation. This normal operation is obtained by the introduction of pulses to the terminal 30 for storage in the unit 10. Of course, a pulse may also be subsequently introduced to the terminal 36 for the production of a sequence of pulses by the unit 10 in accordance with the information stored in the static register 16.

Therefore, the introduction of a pulse to the input terminal 36 causes the system to obtain the sequential production of a plurality of pulses in accordance with information stored in parallel form. The sequential production of signals is obtained from the dynamic storage unit 10 in accordance with the information stored in the static register 16 in parallel form. This conversion of digital information from parallel form to serial form occurs during a commutating period initiated by the introduction of a pulse to the terminal 36.

At the end of the commutating period, the system automatically resets itself for normal operation so that no further conversion of information from a parallel form to a serial form can occur until a subsequent introduction of a pulse to the terminal 36. This enables the information stored in the storage unit 10 by the introduction of pulses to the terminal 30 to be replaced at any time by new information set up in the static register 16.

As noted above, the static register 16 may be manually operated to establish any particular sequence of information to be inserted into the dynamic storage unit 10. Alternately, the static register may comprise a series of flip-flops which are controlled to assume different operational states corresponding to data which is to be inserted into the dynamic storage unit 10. In general, therefore, the invention provides an improved system for permitting data stored in parallel form to be serially obtained from a dynamic storage unit.

I claim:

1. In combination: a static register for storing a plurality of bits of data in parallel form, a dynamic storage unit for storing a corresponding plurality of bits of data in serial circulating form, means coupled to the dynamic storage unit for introducing a pulse into the dynamic storage unit, means coupled to the dynamic storage unit for sampling at successive intervals the introduced pulse as it circulates through the storage unit to produce a plurality of successive pulses in response thereto and for introducing the successive pulses to the static register to obtain a series of serial output pulses corresponding to the parallel-stored data therein, and means coupled to the static register for introducing the serial output pulses therefrom to the dynamic storage unit to be circulated therein.

2. In combination: a static register for storing a plurality of bits of data in parallel form, a dynamic storage unit for storing a corresponding plurality of bits of data as represented by pulses of a first polarity for a serial passage of the pulses from the dynamic storage unit, means coupled to the dynamic storage unit for introducing a pulse of a second polarity into the dynamic storage unit, means coupled to the dynamic storage unit and responsive only to pulses of the second polarity for sampling at successive intervals the introduced pulse of the second polarity during the passage of the pulse through the storage unit to produce a plurality of successive pulses of the second polarity and for introducing the successive pulses of the second polarity to the static register to obtain a series of serial output pulses corresponding to the parallel-stored data in the static register, and means coupled to the static register for introducing the serial output pulses therefrom to the dynamic storage unit for storage as pulses of the first polarity for subsequent passage in serial form through the unit.

3. The combination set forth in claim 2 including means responsive to the passage of the pulse of the second polarity through the dynamic storage unit to prevent any further passage of pulses through the dynamic storage unit until the further introduction of a pulse of the second polarity by the first means into the dynamic storage unit.

4. In a signal storage system, the combination of: a dynamic storage unit for circulating discrete pulses corresponding to data introduced thereto, a plurality of individual switching means each having a first operating condition and a second operating condition, means coupled to the dynamic storage unit for introducing a pulse to the dynamic storage unit to be circulated thereby, sampling means coupled to the dynamic storage unit at spaced intervals with respect thereto and responsive to the pulse from the last mentioned means to introduce pulses in sequence to successive ones of the switching means in timed relationship to the circulation of the introduced pulse through the dynamic storage unit to obtain the production of a sequence of output pulses in accordance with the operation of the successive switching means in the first and second conditions, and means coupled to the switching means for introducing the sequence of output pulses from the switching means to the dynamic storage unit for storage in the storage means for subsequent passage through the storage means in serial form.

5. In a signal storage system, the combination of: a dynamic storage unit for passing discrete pulses of first and second polarities, a plurality of individual switching means each having a first operating condition and a second operating condition, means coupled to the dynamic storage unit for introducing a pulse of the second polarity to the dynamic storage unit for passage through the unit, sampling means responsive only to pulses of the second polarity and coupled to the dynamic storage unit at spaced intervals with respect thereto to introduce pulses in sequence to successive ones of the switching means in correspondence with the passage of the pulse of the second polarity through the dynamic storage unit for the production of a series of output pulses at time intervals related to the successive pulses introduced thereto and with a pattern related to the operating condition of the individual switching means, and means coupled to the switching means for utilizing the output pulses for storage of such pulses in the unit for serial passage through the unit to introduce a series of pulses of the first polarity to the storage unit with a pattern related to that of the output pulses.

6. In a signal storage system, the combination of: a dynamic storage unit for passing discrete pulses of first and second polarities, a plurality of individual switching means each having a first operating condition and a second operating condition, means coupled to the dynamic storage unit for introducing a pulse of the second polarity to the dynamic storage unit for passage through the unit, a plurality of individual sampling means coupled to the dynamic storage unit at spaced intervals with respect thereto and connected to respective ones of the individual switching means for the introduction of pulses in sequence to successive ones of the switching means in correspondence with the passage of the pulse of the second polarity through the storage unit, unidirectional means included in the sampling means for rendering the sampling means responsive to pulses of only the second polarity in the storage unit, and means coupled to the switching means for introducing a series of pulses of the first polarity in serial form to the dynamic storage unit at times related to the pulses introduced to the switching means by the sampling means and in a pattern related to the operation of the successive switching means in the first and second states.

7. In a signal storage system, the combination of: a dynamic storage unit for passing discrete pulses of first and second polarities, a plurality of individual switching means each having a first operating condition and a second operating condition, means for providing regularly recurring clock timing pulses, means including a gate circuit responsive to said clock pulses and coupled to the dynamic storage unit for introducing a pulse of the second polarity to the dynamic storage unit for passage of the clock pulse through the unit, means coupled to the gate circuit for introducing a control pulse to the gate circuit to enable the gate circuit to pass one of the clock pulses and thereby form said pulse of the second polarity, circuit means responsive to the passage of said one of the clock pulses by the gate circuit to prevent the passage of further clock pulses through the gate circuit, a plurality of individual sampling means coupled to the dynamic storage unit at spaced intervals with respect thereto and connected to respective ones of the individual switching means to introduce pulses in sequence to successive ones of the switching means in accordance with the circulation of the pulse of the second polarity through the storage unit, unidirectional means included in each of the sampling means for rendering the sampling means responsive to pulses of only the second polarity circulated in the storage unit, and means coupled to the switching means for introducing a series of pulses of the first polarity in serial form to the dynamic storage unit at times related to the occurrence of the clock pulses and in a pattern dependent upon the condition of successive ones of the switching means.

8. In a signal storage system, the combination of: a dynamic storage unit for passing discrete pulses of first and second polarities, a plurality of individual switching means each having a first operating condition and a second operating condition, means coupled to the dynamic storage unit for introducing a pulse of the second polarity to the dynamic storage unit for passage through the unit, a plurality of individual sampling means coupled to the dynamic storage unit at spaced intervals with respect thereto and coupled to respective ones of the individual switching means to introduce pulses in sequence to successive ones of the switching means in accordance with the passage of the pulse of the second polarity through the storage unit, unidirectional means included in each of the sampling means for rendering the sampling means responsive to pulses of only the second polarity in the storage unit, means including a gate circuit coupled to the switching means for introducing a plurality of pulses of the first polarity in serial form to the dynamic storage unit and in a pattern related to the operational condition of successive ones of the switching means, means coupled to the gate circuit for introducing a series of regularly recurring clock timing pulses to the gate circuit for the passage of the series of pulses of the first polarity as such pulses occur in timed coincidence with respective ones of the clock pulses, and means responsive to the passage of the pulse of the second polarity through the dynamic storage unit to prevent said gate circuit from responding to the clock pulses and to the pulses from the switching means.

9. In a signal storage system, the combination of: a dynamic storage unit for passing discrete pulses of first and second polarities, a plurality of individual switching means each constructed to be set to a first operating condition and a second operating condition, electrical circuitry including a first gate circuit coupled to the dynamic storage unit for introducing a pulse of the second polarity to the dynamic storage unit for passage through the unit, electrical circuitry coupled to the first gate circuit for introducing regularly recurring clock timing pulses to the gate circuit, electrical circuitry responsive to a control pulse to enable the first gate circuit to pass one of the clock pulses to form said pulse of the second polarity and responsive to the passage of such clock pulse to prevent any further passage of clock pulses through the gate circuit, a plurality of individual sampling circuits coupled to the dynamic storage unit at spaced intervals with respect thereto and coupled to respective ones of the individual switching means to introduce pulses in sequence to successive ones of the switching means in timed relationship with the circulation of the pulse of the second polarity through the dynamic storage unit and in a pattern related to the setting of the different switching means in the plurality in the first and second operating conditions, unidirectional means included in each of the sampling circuits for rendering the sampling circuits responsive only to pulses of the first polarity circulated in the storage unit, and electrical circuitry including a second gate circuit responsive to the pulses of the first polarity from the sampling circuits and responsive to the clock-timing pulses for introducing the pulses of the first polarity in serial form to the dynamic storage unit in timed coincidence with respective ones of the clock pulses.

10. In combination: a dynamic storage register constructed to obtain a passage of a plurality of pulses through the register, electrical circuitry operatively coupled to the register for introducing a pulse of a first polarity to the register for the passage of the pulse through the register, electrical circuitry responsive to the pulses from the dynamic storage register for providing for a passage through the dynamic storage register of a particular sequence of pulses of a second polarity upon the passage of the pulse of the first polarity through the dynamic storage register and for preventing the production of any pulses upon the passage of each pulse of the second polarity through the dynamic storage register, and electrical circuitry responsive to the particular sequence of pulses passed by the last mentioned circuitry for introducing such pulses to the dynamic storage register for storage by the dynamic storage register.

11. In combination: a dynamic storage register for storing a plurality of pulses representing different bits of data and for obtaining a passage of the pulses sequentially through the register, first means operatively coupled to the dynamic storage register for introducing a pulse of a first polarity to the register for the passage of the pulse through the register, parallel means operatively coupled to the dynamic storage unit and responsive to the passage of the pulse of the first polarity through the dynamic storage unit for producing a particular sequence of pulses of a second polarity opposite to the first polarity, means responsive to the production of the particular sequence of pulses of the second polarity for introducing such sequence of pulses to the dynamic storage unit for the storage of such sequence of such pulses by the unit, and means responsive to the pulses of the second polarity for preventing such pulses from being introduced to the means for producing the particular sequence of pulses of the second polarity.

12. The combination set forth in claim 11 including means for introducing clock pulses of the second polarity to the dynamic storage register to obtain the passage of such pulses through the dynamic storage register without introduction to the means for producing the particular sequence of pulses of the second polarity.

13. The combination set forth in claim 11 including means responsive to the passage of the pulse of first polarity through the dynamic storage register for controlling the operation of the dynamic storage register to prevent the passage of pulses of the first polarity through the register until the introduction of a second pulse of the first polarity to the first means.

References Cited in the file of this patent

UNITED STATES PATENTS

| | | |
|---|---|---|
| 2,577,141 | Mauchly et al. | Dec. 4, 1951 |
| 2,635,229 | Gloess | Apr. 14, 1953 |
| 2,729,811 | Gloess | Jan. 3, 1956 |
| 2,771,244 | Raymond | Nov. 20, 1956 |
| 2,873,386 | Schlei | Feb. 10, 1959 |
| 2,914,757 | Millership et al. | Nov. 24, 1959 |